Fig. 7

Dec. 6, 1932.   J. B. FRECH ET AL   1,889,958
MACHINE FOR PREPARING MAILABLE MATTER
Filed Oct. 19, 1928   8 Sheets-Sheet 7

Patented Dec. 6, 1932

1,889,958

UNITED STATES PATENT OFFICE

JACOB B. FRECH, ELMER J. FRECH, AND WESLEY S. COX, OF CINCINNATI, OHIO

MACHINE FOR PREPARING MAILABLE MATTER

Application filed October 19, 1928. Serial No. 313,454.

This invention relates to a machine for preparing mailable matter, particularly advertising circulars, letters, and similar inserts.

An object of the invention is to provide a machine for the purpose stated, which will operate upon an envelope blank and a selected number of inserts to discharge same in assembled condition.

Another object is to provide a machine of this type which will cease to function in the event that an envelope or one of a plurality of circulars, fails to reach the assembling mechanism.

Another object is to so construct the machine that circular feeding units may readily be added to or removed from the machine according to the number of inserts to be received by each envelope.

Another object is to provide means whereby various units, such as flap gluing mechanism, may readily be rendered inoperative without affecting the regular sequence of operation of other units of the machine.

Another object is simplification and the elimination of parts accomplished by the use of electrically controlled clutches and relays throughout the machine.

These and other objects are attained by the means described herein and disclosed in the accompanying drawings, in which.

Figures 1, 2:
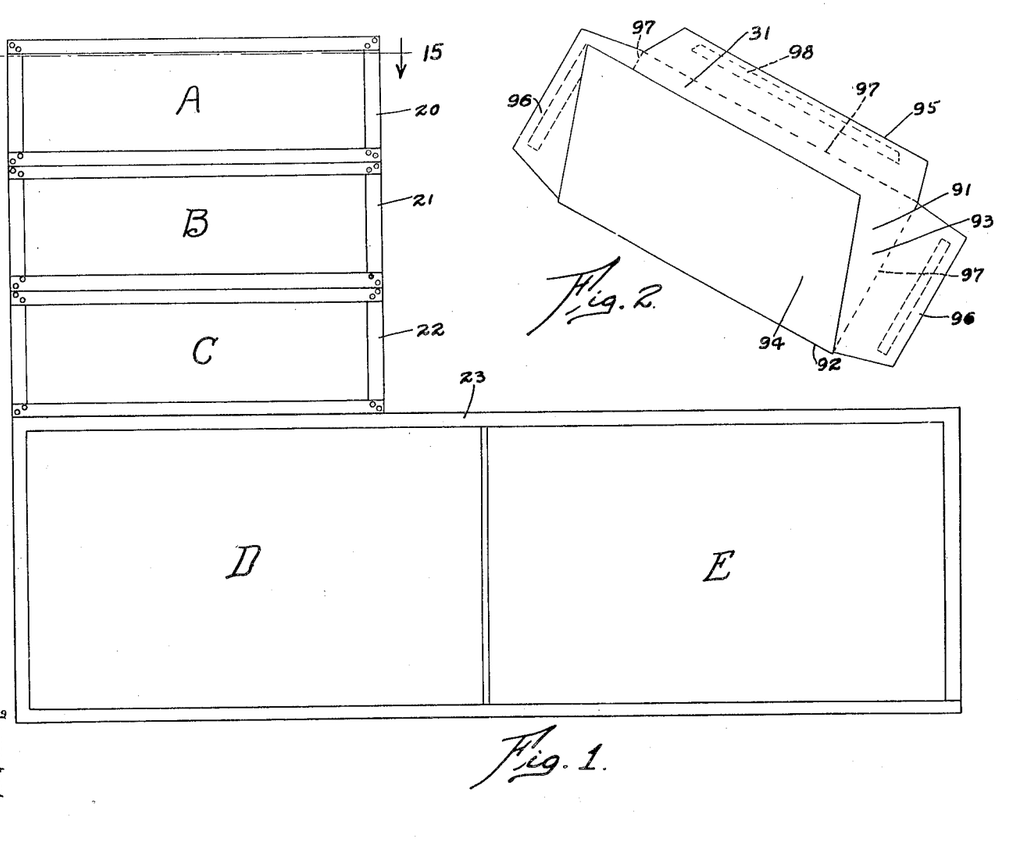
Fig. 1 is a side elevational view of the machine of invention encased in a suitable housing provided with removable cover plates A, B, C, D, and E.
Fig. 2 is a isometric view of an envelope blank adapted for use with the device of invention.

The machine of this invention is adapted to operate upon envelope blanks and inserts such as circulars, cards, letters and the like, whereby to fold and fasten an envelope blank about one, or a number of such inserts, and to discharge the closed parcel in condition for receiving an address and postage stamp. The machine is provided with envelope and insert receivers which will hereinafter be referred to as hoppers. The hopper for envelope blanks is adapted to receive a supply of blanks having a single longitudinal fold, and suitable unglued top and side flaps lying in a plane with the front side of the enevelope blank. These blanks are discharged one by one from the hopper and stopped adjacent a conveyor, by means of which groups of inserts are carried to and deposited in the envelope blanks (Fig. 2). The inserts are formed into groups by consecutively disposing in alignment with each one of a plurality of insert discharge mechanisms, suitable buckets attached to the conveyor. The insert discharge mechanisms are capable of operation only at such time as the buckets are in alignment therewith. Means are also provided for precluding movement of the buckets and envelope blank in the event that one or more of the insert discharge units fail to discharge an insert. It is to be understood, therefore, that each and every envelope leaving the machine contains the prescribed number of inserts. The flaps of each envelope blank properly supplied with inserts, are then coated with glue and are subsequently folded upon the envelope body, whereby to seal the enclosures within the envelope. The sealed parcel is then discharged from the machine in condition for addressing and stamping, or for other subsequent operations. A detailed description of the device follows.

The machine of this invention is composed of indivdual removable units 20, 21, 22, and 23. Units 21 and 22 are insert feed units identical in construction.

Any desired number of such units may be readily interposed and connected between the top and bottom drive units 20 and 23, according to the number of different inserts to be placed in each envelope. For example, a machine arranged to prepare an envelope containing four different types of inserts, will carry four units such as 21, the hopper of each unit containing a supply of different inserts. The machine shown in Fig. 1 is provided with two insert feed units and is therefore adapted for use in assembling an envelope and two inserts. The units are retained in alignment by means of studs 500 insertable in perforatons 501 provided in an adjoining unit.

The top and bottom driving units 20 and 23 are each provided with a conveyor roller supporting a sectional endless bucket conveyor belt 24 adapted to pass through each insert feed unit.

The rollers are indicated by numerals 25 and 26 in units 20 and 23 respectively. Buckets or shelves 27 are mounted upon the outside surface of the belt at intervals (Fig. 12) and are adapted to receive the inserts discharged from the various insert feed units, above referred to, and to convey the inserts to a conveyor comprising belts 28, 29 and 30 which conveyor deposits the inserts in an envelope blank 31 held in open position by a suitable distending device 32 located in the drive compartment 23.

The bucket conveyor 24 comprises sections 33 of fabric or other suitable material having secured to one end thereof one section 34 of a longitudinal hinge, and at the opposite end a complementary hinge section 35 which carries one of the buckets 27. In a preferred form of the device, the hinge sections may be disconnected by removal of a longitudinal hinge pin 36. It should be apparent from the foregoing that when insert feed units 21 are added to or removed from the machine, the length of the conveyor belt 24 may be changed accordingly by adding or removing sections 33.

Figure 7:
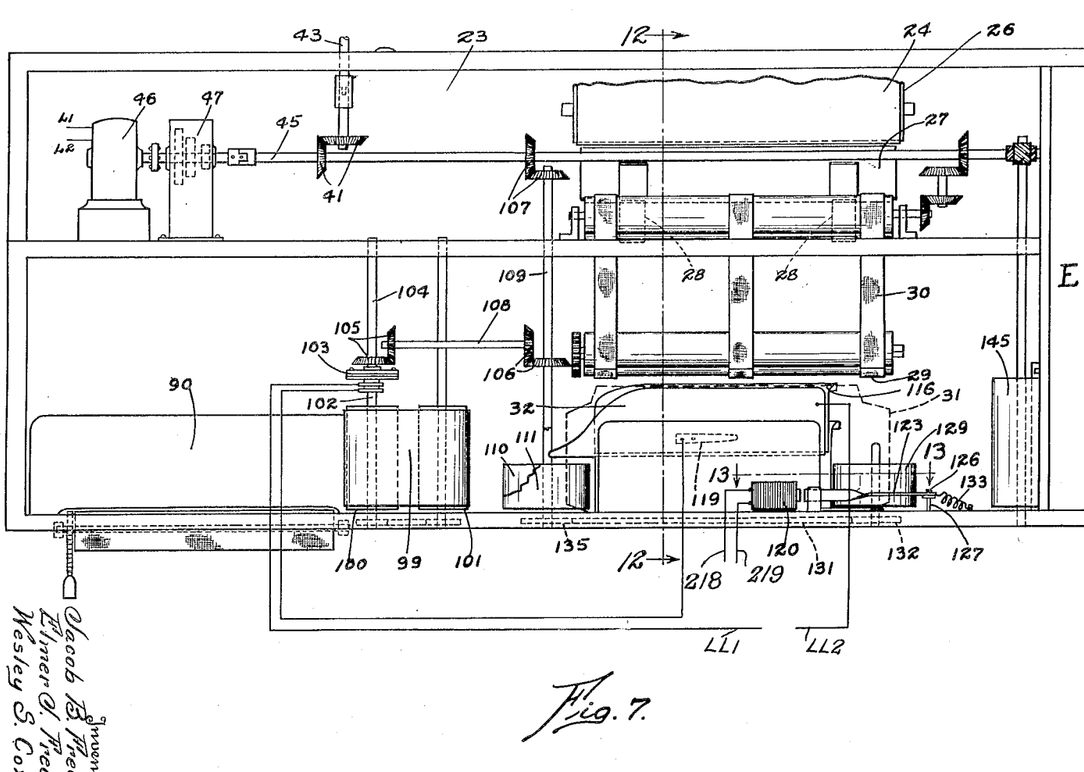
Fig. 7 is a side elevational view of the mechanism behind cover plate D.
Figure 15:
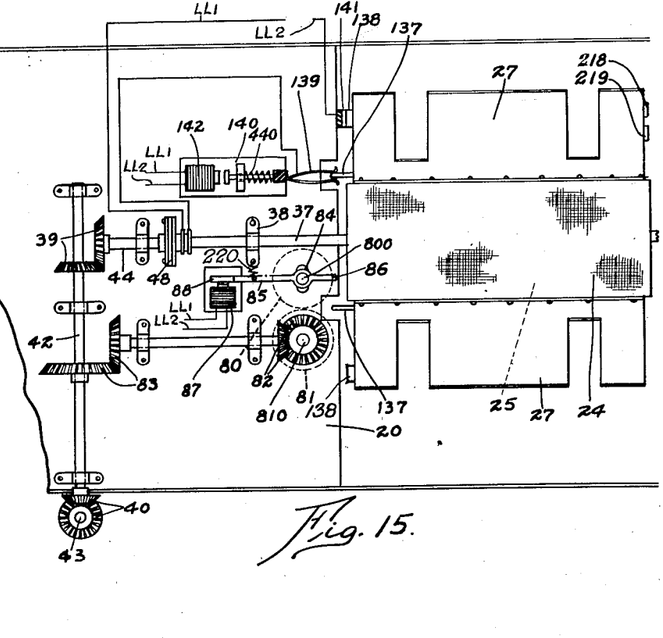
Fig. 15 is a cross sectional view taken on line 15—15 of Fig. 1.

Movement is imparted to conveyor 24 by rotating the upper roller 25 upon which the conveyor rests (Fig. 15). Said roller is fixedly mounted upon a rotatable shaft 37 suitably journaled in bearings 38 and driven by sets of bevel gears or the like 39, 40 and 41 transmitting rotatory motion of main drive shaft 45 to shafts 42, 43 and 44. Drive shaft 45 is rotated by a motor 46 which may be coupled to a suitable reduction gear box 47 of any approved type (Fig. 7). An electrically operated normally engaged clutch 48 provides a driving connection between shafts 44 and 37 (Fig. 15) whereby the buckets may be stopped while receiving the inserts discharged from the insert feed units. A detailed description of one of said units follows.

Figure 3:
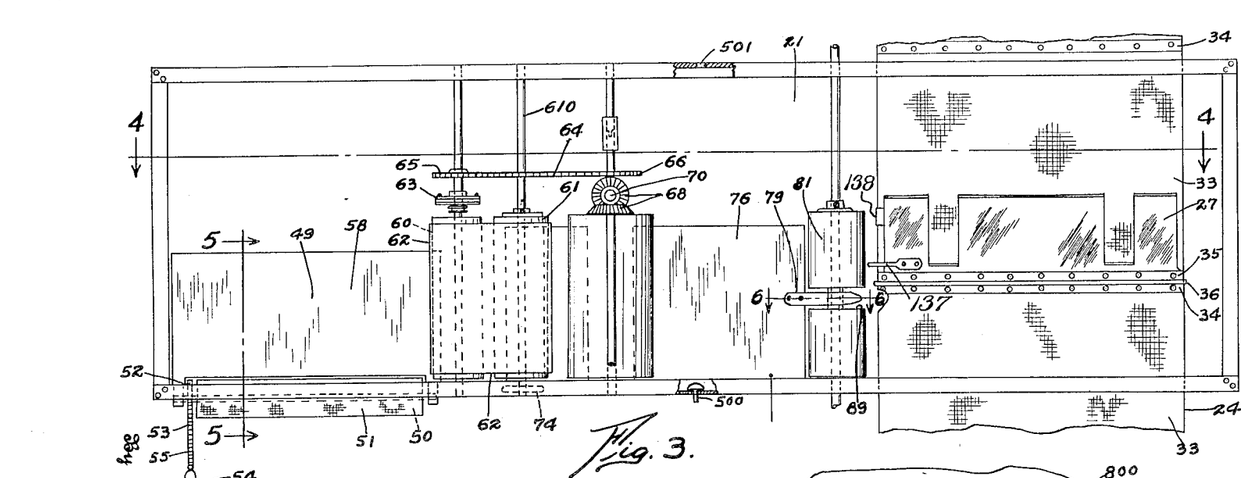
Fig. 3 is a side elevational view of an insert feeding unit, cover plate B being removed therefrom. Plate C covers a similar unit.
Figure 4:
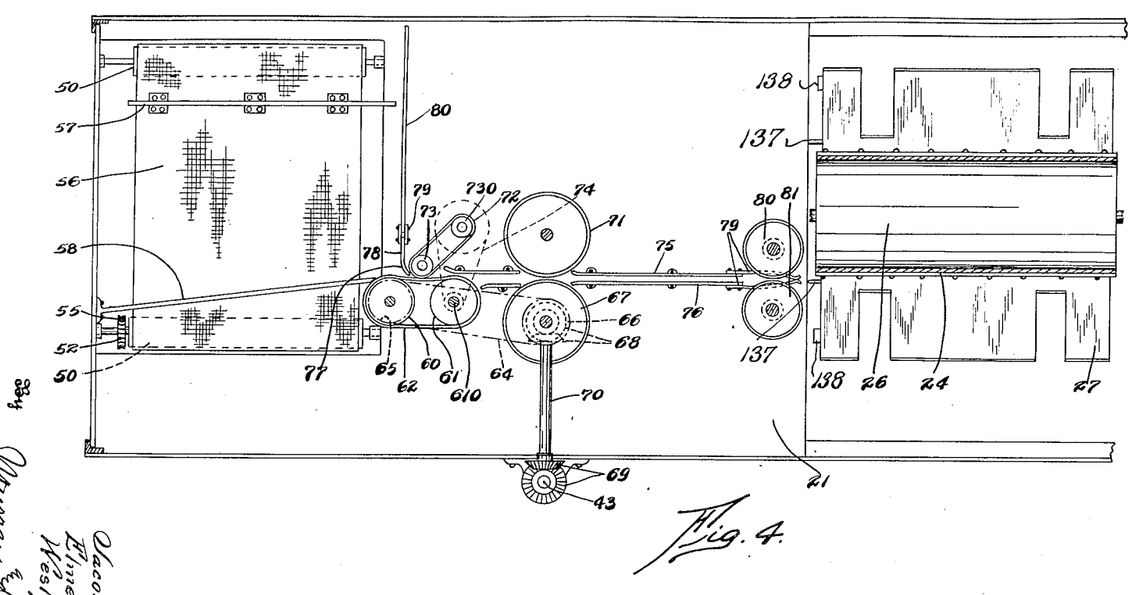
Fig. 4 is a cross sectional view on line 4—4 of Fig. 3.
Figure 5:
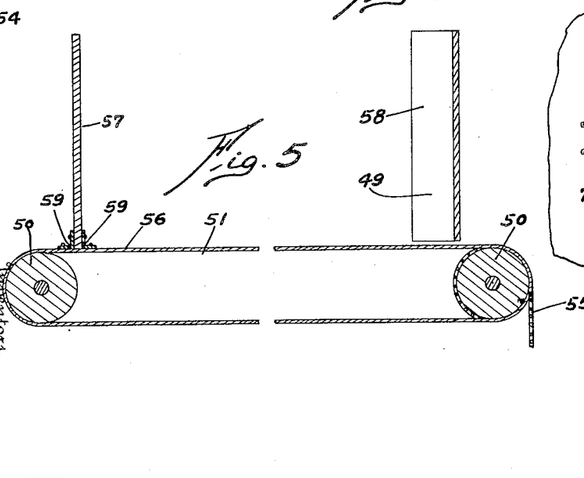
Fig. 5 is a cross sectional view of a hopper taken on line 5—5 of Fig. 3.

Reference is made to Figs. 3 and 4 disclosing in detail the mechanism of an insert feed unit, which comprises a hopper and discharge apparatus. The hopper, indicated generally by 49, comprises a pair of rotatable spaced parallel rollers 50 about which passes an endless belt 51. One of the rollers 50 is provided with a sprocket 52 upon which may be wound a chain 53 secured at one end to the sprocket and carrying a weight 54 at the free end 55 thereof. Upon the top surface 56 of the belt is secured an upright pusher plate 57 extending transversely of the belt and adapted for movement therewith as the weighted chain tends to rotate the roller 50 for moving the belt. In this manner, circulars and cards or the like placed on edge upon the belt will be constantly urged toward a stationary stop plate 58 suitably mounted upon the frame of the insert feed unit as shown in Fig. 4. Through the agency of means to be presently described, the insert abutting the stop plate is discharged onto one of the buckets 27 which automatically assumes a position in alignment with the discharge means. In instances where the chain and weight arrangement might prove impracticable, a spring urged pusher plate could be substituted therefor, or one of the rollers 50 could be provided with a spring mechanism similating a window shade roller. Pusher plate 57 may be mounted upon belt 56 by any suitable means such as by angle strips 59 riveted to the belt and plate.

Clutch controlled means are employed for effecting removal of inserts from the hopper. Said means comprises a pair of spaced parallel rollers 60 and 61 encircled by a wide endless band 62 preferably of rubber or other resilient material. Roller 61 may be an idler and roller 60 a driven roll, the rotation thereof being remote controlled by electrical clutch means indicated by 63. Rotation is imparted to roller 60 by means of a chain 64 passing over sprockets 65 and 66, which are rotatable with roller 60 and advance roller 67, respectively. The advance roller is continuously driven from shaft 43 by any suitable means, such as pairs of bevel gears 68 and 69 associated with a shaft 70 mounted for rotation upon the frame of the unit 21. A second advance roller 71 is rotatably mounted on the frame in peripheral contact with roller 67, from which the roller 71 receives rotatory movement. The contact surfaces of said rollers are preferably covered with friction material, such as rubber or the like, to assist the rollers in gripping an insert projected therebetween by the mechanism comprising band 62.

A retarder is provided for precluding the removal of more than one insert upon each actuation of the mechanism driving the belt 62. The retarder comprises an endless band 72 extending about a pair of spaced parallel rotatable rollers 73 and 730, one of which, for example, 730, is driven by a sprocket and chain means 74 connected to the shaft 610 of roller 61. It will be observed from the disclosure in Fig. 4 that roller 73 is disposed in close proximity with band 62 which causes band 72 to lightly contact band 62 at a point between the centers of rollers 60 and 61. It should be clearly apparent from the drawings, that an insert lying against plate 58 with one end thereof contacting belt 62, will be carried, upon clockwise movement of the belt, past the belt 72 and between the continuously rotating discharge rollers 67 and 71 which operate to lodge the insert between vertical guides 75 and 76. It should be noted that belt 72 moves in clockwise direction, and by reason of its position relative to belt 62, permits the passage of only one insert. An auxiliary retarder comprising a finger 77 of flexible material, may be provided for use when certain grades of material are handled. The finger 77 may be formed of a rectangular sheet of rubber or the like 78 riveted or otherwise secured as at 79 to a suitable support 80, and disposed transversely of belt 62. Support 80 may be a guide member (Fig. 4) arranged to limit the extent to which the inserts may be introduced into the hopper. Under some circumstances depending on the finish and weight of the inserts, the member 78 may either be eliminated or used as a sole means for retarding the inserts.

The advancer rollers 67 and 71 are adapted to advance an insert until the forward edge thereof passes between a pair of electrical contacts 79 and a set of normally inoperative kick rolls 80 and 81. The insert remains in this position until inserts of other feed units are advanced to occupy the same relative position, whereupon electrical means are actuated for stopping conveyor 24 and disposing a bucket 27 in alignment with each one of the insert feed units. Kick rolls 80 and 81 are then actuated to eject the inserts from guide 75—76 into the buckets. The specific means for accomplishing the above will be described in detail hereinafter.

The kick rolls 80 and 81 of each unit may be placed in operative and inoperative positions, as may best be described with reference to Fig. 15. The shaft 810, carrying rolls 81, is rotatably mounted in suitable bearings carried by the frame of each unit. Rotation is imparted to said shaft and rolls by means of sets of bevel gears 82 and 83 arranged to transmit rotatory motion of drive shaft 42, as shown. Shaft 800, carrying rolls 80, is rotatably mounted in a movable bearing 84 which is formed in an arm 85 pivotaly mounted upon the frame 20 at one end, as indicated at 86. The arm is moved about its pivotal mounting by an electro-magnet 87 which, when energized, attracts the armature end 88 of the arm to place rolls 80 and 81 in contact upon one another (Fig. 15). De-energization of the magnet permits separation of the rolls by the action of a spring 220, whereupon an insert placed therebetween will not be ejected from between the rolls. A similar co-acting arm and magnet may be provided for moving the opposite end of shaft 800, and may be disposed in one of the lowermost compartments such as 22 or 23. Energization of the electro-magnet is by automatic means which will be described later.

Figure 6:
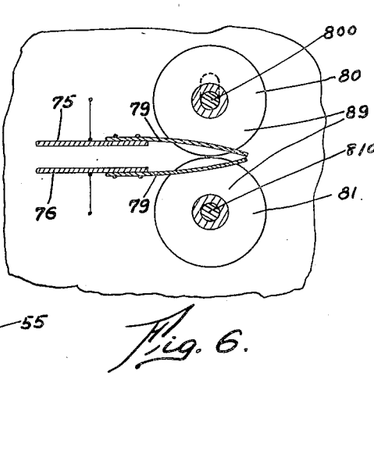
Fig. 6 is a cross sectional view taken on line 6—6 of Fig. 3.

The disclosure in Figs. 3 and 6 shows the manner in which the kick rolls 80 and 81 may be constructed to permit placing the electrical contacts 79 in the path of movement of the inserts. A groove 89 may be cut in each roll for receiving the contacts, or if desired, each kick roll may be constructed of two independent small rolls spacedly mounted on each of the shafts 800 and 810.

The envelope blank feeding mechanism, which is contained within compartment 23, operates in unison with the insert feeding units. Reference is now made to Fig. 7 which is an elevational view showing the mechanism behind cover plate D of Fig. 1. The envelope blank feed is provided with a hopper 90 which is identical with the hopper 49 of the insert feed unit. Said hopper is adapted to receive blanks of the general type illustrated in Fig. 2 of the drawings. The blank comprises a flat sheet 91 bent upon itself as at 92 to form the front and rear sides 93 and 94 respectively, of an envelope. Front side 93 is provided with a top flap 95 and side flaps 96, all lying in a plane with the front side 93. Broken lines 97 indicate the places where the flaps are creased or folded over as the blank passes through the machine. Broken lines 98 indicate a ribbon of glue which is applied to the top flap as the blank passes through a gluing mechanism of the machine. Similar ribbons of glue are applied to the side flaps 96.

The means for removing envelope blanks one by one from hopper 90 may be similar to the means disclosed in Fig. 4. Belt 99 and rolls 100 and 101 of Fig. 7 correspond to belt 62 and rolls 60 and 61 of Fig. 4, respectively. As shown in Fig. 7, roll 100 is mounted upon a vertical shaft 102 which may be connected, upon energization of an electrically controlled clutch 103, to a continuously rotating shaft 104 driven from main drive shaft 45 by means of pairs of bevel gears 105, 106, and 107 transmitting rotary motion through shafts 108 and 109. A pair of advancer rolls 110 and 111, corresponding to rolls 67 and 71, (Fig. 4), receive rotary motion from shaft 109 for advancing the envelope blank into a distender 32 (Fig. 12) which serves to dispose the blank 31 in position directly beneath the dispatch conveyor 29—30.

Figures 12, 13, 14:
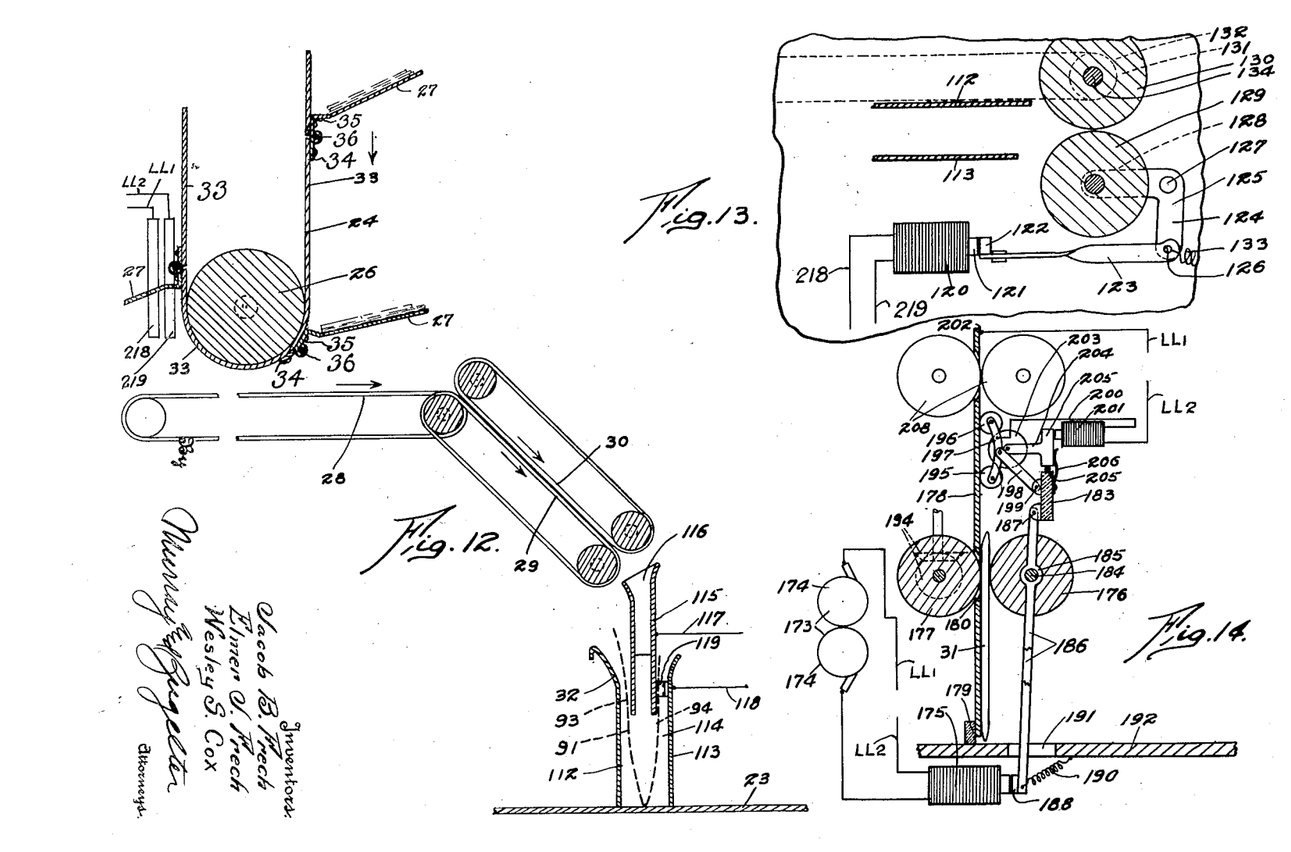
Fig. 12 is a cross sectional view taken on line 12—12 of Fig. 7.
Fig. 13 is a cross sectional view taken on line 13—13 of Fig. 7.
Fig. 14 is a cross sectional view of a flap gluer taken on line 14—14 of Fig. 8.

Distender 32 comprises a pair of spaced parallel plates 112 and 113 suitably mounted upon frame 23 in alignment with the direction of travel of the blanks. Disposed within the space 114 between the plates, is a tube or the like 115 into which the dispatch conveyor 29—30 may deposit groups of inserts ready for insertion in the envelopes. The tube is provided with a flared mouth 116. The envelope blank 31 upon entering the distender assumes a position such that the front side 93 is disposed between the tube and plate 112, (Fig. 12), and the rear side assumes a position between the tube and plate 113. An electric conductor 117 is secured to tube 115, and a second conductor 118 is secured to plate 113. The circuit of the conductors is normally closed by a switch 119 comprising a strip of resilient metal secured to plate 113 and contacting tube 115. An envelope passing into the distender automatically opens switch 119 as the front piece 94 thereof passes between the resilient member and the tube (Fig. 12). The switch 119 is electrically connected (Fig. 7) in series with electrically operated clutch 103, which, upon closing of switch 119, is actuated to transmit rotation of shaft 104, to shaft 102 carrying discharge roller 100, for discharging an envelope blank from the hopper 90. It should be apparent from the foregoing that as long as an envelope blank remains in position in the distender 32, the circuit to the clutch 103 will remain open and blanks will not feed from the hopper.

An envelope blank resting in the distender 32 cannot be discharged therefrom until one of the buckets 27 deposits a group of inserts upon conveyor belt 28, (Fig. 12), and subsequently bridges a pair of contacts 218 and 219 for closing a circuit embracing the envelope kick-out magnet 120, (Figs. 7 and 13). The magnet 120 is electrically connected in series with the contacts 218 and 219 which may be properly termed a normally open switch. Energization of magnet 120 causes the core 121 of the magnet to attract an armature 122 mounted on arm 123. Said arm is pivotally mounted as at 126, on one arm 124 of a bell crank 125 which may be moved about a pivot 127. Arm 128 of the bell crank carries a rotatable kick roller 129 normally held out of contact with a cooperative continuously driven roller 130, by means of a spring 133. Roller 130 is continuously driven by any suitable means such as a chain 131 passing over a sprocket 132 secured to roller shaft 134, and a sprocket 135 secured to continuously driven shaft 109. Energization of magnet 120 causes rollers 129 and 130 to grip the filled blank 31 and to project same toward the glue applying mechanism. It should be noted that when blank 31 leaves the distender 32, switch 119 is permitted to close the circuit of clutch 103, whereupon another envelope is drawn from the hopper and lodged in the distender in a manner previously described. Rolls 129 and 130 are preferably rubber surfaced.

It should be observed that each bucket 27 carries electrical contacts 137 and 138, contact 137 being adapted to engage a spring contact 139 of a switch 140, and contact 138 to simultaneously engage a contact 141 secured to the frame 20. Contacts 139 and 141 are normally in the path of movement of contacts 137 and 138. The circuit completed by contacts 137 and 138 serves to disengage electrically operated clutch 48 whereupon the driving connection to the conveyor is broken and the buckets remain in position for receiving inserts from the innert feed units.

By means to be described in the operation, the kick rolls of each insert feed unit are now actuated for projecting the inserts into the buckets, whereupon switch contacts 139 are pulled out of contact with contact 137 by means of a magnet 142. By thus breaking the circuit, clutch 48 is deenergized, and returns to locking position for connecting conveyor shaft 37 to driven shaft 44. The conveyor thereupon moves until another contact 137 enters the contacts 139.

Figures 8, 9, 10:
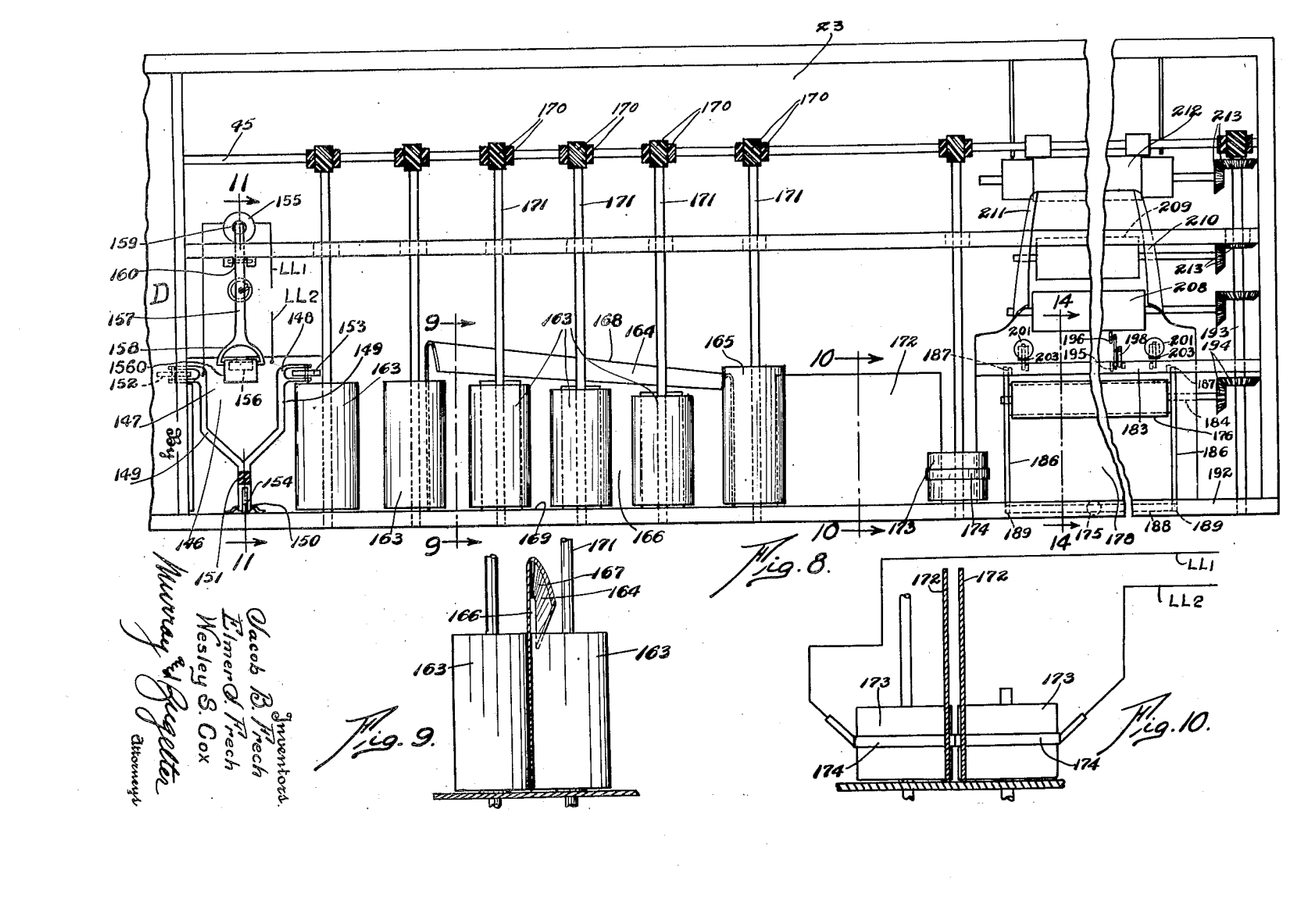
Fig. 8 is a side elevational view of the mechanism behind cover plate E.
Fig. 9 is a cross sectional view of a flap feller taken on line 9—9 of Fig. 8.
Fig. 10 is a cross sectional view on line 10—10 of Fig. 8.

Reference is now made to Fig. 8 wherein is disclosed the mechanism which receives and operates upon an envelope blank, supplied with inserts, subsequent to ejection thereof from the distender 32. The envelope blank is fed, by a pair of continuously rotating conveyor rolls 145, into a glue applying device 146. Said device comprises a flat contact plate 147 vertically mounted upon and insulated from the frame of unit 23. A forked member 148 comprising upwardly extending arms 149 is pivotally mounted upon the frame as at 150, the pivotal mounting being spaced a short distance from the face of plate 147. The arms of member 148 are insulated from the frame 23 by any suitable means such as an insertion of insulation 151 in the member at a point between the arms and the pivotal mounting.

The upper extremities of arms 149 are provided with rotatable discs or contacts 152 and 153 which are adapted to normally contact the plate 147. The discs or contacts are yieldingly retained in said position by any suitable means such as a flat spring 154 arranged for the purpose. When an envelope blank is directed into the gluing device, the top flap thereof passes first betwen the plate and disc 152, and upon continued forward movement thereof, between the plate and disc 153. The envelope flap, by intercepting the contact discs and contact plate, opens an electrical circuit embracing an electro-magnet 155 which is normally energized for rendering inoperative a glue applying device or roller 156 operating in a glue reservoir 1560. The glue applying device operates to glue the top flap of an envelope blank when the circuit is thus broken.

Figure 11:
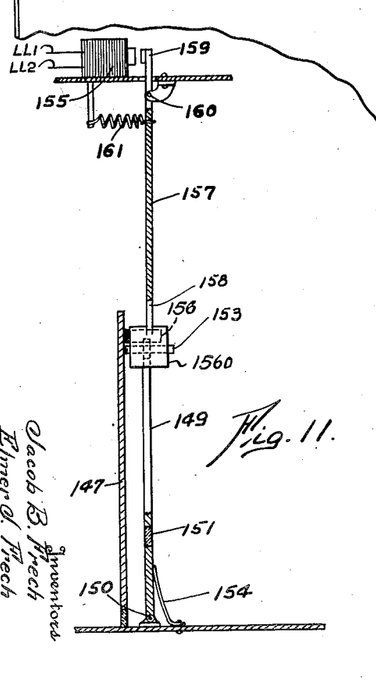
Fig. 11 is a cross sectional view on line 11—11 of Fig. 8.

The glue applying means comprises a depending glue roll supporting arm 157 provided at one end thereof with a securing means or bracket 158 upon which the glue roll 156 may be mounted within a glue reservoir 1560. The opposite end 159 of said arm forms an armature, adapted to cooperate with magnet 155 for rocking the arm about a pivotal mounting 160. It should be apparent from the disclosure in Fig. 11 that energization of magnet 155 causes armature 159 to move toward the magnet, whereby to rock the arm 157 and move gluing device 156 from contact with plate 147. When the magnet is de-energized, a spring 161 returns the gluing device to operative or gluing position. It should be apparent therefore that an envelope flap passing through the gluing device will first raise disc or contact 152, whereupon the circuit is made through contact 153. Then, as the flap breaks the contact 153, the magnet is de-energized and spring 161 moves the glue roll into operative position. As the flap passes from beneath disc 152, the circuit is again closed, whereupon the glue device is rendered inoperative. By the above described means, glue is applied to the flap in ribbon form, shown in Fig. 2, without smearing either the plate 147 or the blanks.

The envelope blank is then moved, by means of conveyor rolls 163, through a feller or folder 164 which folds the glued flap upon the envelope back and then directs the envelope between a pair of pressing or sealing rolls 165. These rolls may be electrically or otherwise heated, if desired. The feller comprises a plate 166 turned upon itself adjacent the top edge thereof to form a passage or way 167 for receiving the flap when in upright position. The felling edge 168 is inclined relative to the surface 169, upon which the envelope slides, whereby the glued flap thereof is gradually folded upon the back of the envelope. The conveyor rollers 163 and sealer roller 165 are continuously driven from main shaft 45 by any suitable means such as intermeshing worm gears 170 fixedly mounted on shaft 45 and roll shafts 171.

Upon leaving sealing or pressing means 165, the blank and contents passes through guides 172 which direct it between a pair of electrical contact advancer rolls 173, one of which is continuously rotated by gearing means similar to 170 and 171. Said rolls are rotatably mounted on the frame in close proximity with one another, and each carries a continuous contact band or ring 174. The rings are adapted normally to contact one another for closing a circuit embracing a kick roll magnet 175 which controls the operation of a pair of lift rolls 176 and 177 adapted to advance the envelope into the side flap gluers.

The mechanism for accomplishing the foregoing comprises an upright contact plate 178 suitably secured to and insulated from the frame as at 179. The plate is provided with an aperture 180 through which may extend a portion of the surface of lift roll 177, as shown in Fig. 14. Lift roll 176 is movable toward and from cooperative driven roller 177 for the purpose of admitting therebetween an envelope 31 advanced by the advancer rolls 173. The means for moving roller 176 comprises a cross bar or support member 183, preferably of non-conductive material, suitably mounted on the frame of unit 23. Lift roll 176 is provided with an axle 184 the ends of which are rotatably mounted in bearings 185 provided in a pair of levers or arms 186 pivotally mounted, at the upper ends 187 thereof, upon cross bar 183. A tie bar 188, preferably of iron or other magnetic material, serves to join the lower ends 189 of arms or levers 186 whereby the arms may be moved in unison when magnet 175 is energized, as shown in Fig. 14. A tension spring 190 serves to move arms 186 about pivotal mountings 187 for placing the rolls 176 and 177 in the inoperative position, when magnet 175 is de-energized by the passing of a blank between contact rings 174 on rollers 173. As shown in Fig. 14, the arms 186 may extend through elongated openings 191 in the floor 192 of frame 23, beneath which floor the magnet, armature, and spring may be positioned. Continuous rotation is imparted to roll 177 by means of meshed bevel gears 194 rotated by a shaft 193 as shown in Fig. 8.

As the envelope blank is lifted between rolls 176 and 177, it passes through a glue applying device wherein the side flaps are supplied with glue. The glue applying device for the side flaps is similar to the top flap gluer previously described herein, with the exception that a glue applying element or roller is provided for each side flap.

Attention is now directed to Fig. 14. Electrical conductors 195 and 196 in the form of discs or rollers, are rotatably mounted in spaced relation upon a conductor 197. Conductor 197 is pivotally mounted, at or near its mid point, upon one end of an inclined connecting bar 198, the other end of which is pivotally mounted on non-conductive support or cross bar 183, as at 199. Electrical connection is made, by means of a conductor 200, to a magnet 201 connected in series with a source of electricity and with the plate 178, as at 202. Magnet 201 is adapted, when energized, to retain a side flap gluer 203 in retracted position as shown. The gluer comprises a frame 204 pivotally mounted upon support 183 as at 205. The frame carries a gluing element 203 and is spring urged toward plate 178 by any suitable type of spring 206. When an envelope blank is raised by lift rolls 176 and 177, it passes between contact 195 and plate 178, thereby allowing the circuit of magnet 201 to be kept closed through contact 196. Continued upward movement of said blank causes the blank to pass beneath contact 196, thereby breaking the magnet circuit for freeing the gluer armature 205 and permitting spring 206 to move the gluing element 203 against one of the side flaps of the envelope blank. As the envelope blank continues to move upwardly, contact 195 again makes contact with the plate 178, whereupon magnet 201 is energized to attract armature 205 for lifting the gluer element from the flap. An identical gluing mechanism may be provided for gluing the other side flap of the envelope blank. In that case, another glue applying means 203—204 would be pivoted upon member 183 to operate in unison with the glue applying means just described. In the event that it is desired to close only one end of an envelope by gluing same, one of the gluers may be eliminated, or replaced by an end flap tucker of any approved type.

After the side flap gluing operation is completed, the envelope body is gripped between sets of conveyor rollers, 208 and 209 and projected upwardly through fellers 210 and 211 which fold the glued side flaps upon the back of the envelope in a manner similar to that in which the top flap is folded. A flap sealer roll 212 then presses and seals the envelope, whereupon same is discharged from the machine. Conveyor rollers 208 and 209, and sealer roll 212, may be driven from main shaft 45 by means of sets of bevel gears 213.

Having described and explained the construction and arrangement of elements of the machine of this invention, the mode of operation and sequence of movements will now be explained in detail.

Figure 16:
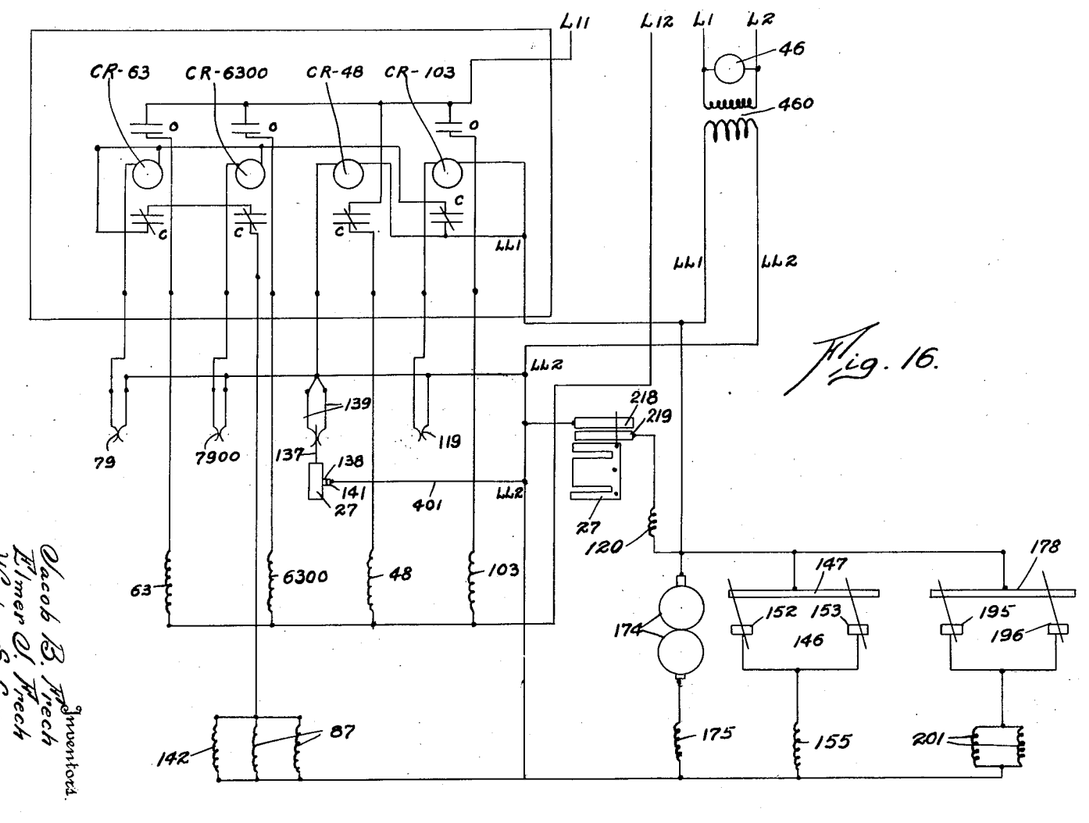
Fig. 16 is a wiring diagram indicating the manner in which the various control elements are electrically connected.

Reference is made to the wiring diagram of Fig. 16, wherein elements corresponding to the elements in the drawings are designated by reference characters corresponding to the reference characters of elements shown in the drawings. In the wiring diagram, L1 and L2 represent 110 volt alternating current leads for operating the motor 46. By providing a transformer 460, leads LL1 and LL2 are supplied with low voltage alternating current for energization of all electromagnets exclusive of those used in the electrically operated clutches, the latter being supplied with 115 volt direct current through leads L11 and L12 connected to a direct current generator ((not shown).

Electrically operated clutches are procurable on the market, therefore it is unnecessary to go into a detailed explanation of their construction. For the purpose of explanation, a particular type of clutch comprising a relay, a normally open switch, and a normally closed switch, is indicated on the diagram. It is to be understood, however, that any type of electrically operated clutch suitable for the purpose may be employed.

In explaining the operation of the device, it will be assumed that provision is made for feeding two inserts into an envelope blank. Since each insert feed unit is provided with an electrically controlled clutch, the clutches may be designated on the diagram by characters 63 and 6300. The clutch relay of clutch 63 is designated by CR—63, and that of clutch 6300, by CR—6300. The normally open and the normally closed contacts associated with each relay are designated by O and C respectively.

Assuming that the hoppers for inserts and envelope blanks are filled, and that the conveyor buckets are empty, lead wires L1 and L2 are supplied with 110 volt alternating current, and lead wires L11 and L12 are connected to a 115 volt direct current source. The 110 volt alternating current is used to operate the motor 46 only. By means of a transformer 460, an induced alternating current of low voltage is supplied to conductors LL1 and LL2.

Motor 46 operates at a uniform speed as long as current is supplied through L1 and L2. The coil of CR—103, being energized by passage of current from LL1 to LL2 through normally closed contacts 119 in the envelope section, operates to break the normally closed contacts C of the relay and to close the normally open contacts O thereof. Closing of said contacts O of CR—103 causes a flow of direct current from L11 to O, through the magnet winding of clutch 103 and return to L12, thereby energizing clutch 103 for dislodging an envelope blank from its hopper. When the envelope blank passes into the distender 32, it opens switch 119, breaking the circuit to CR—103, which in turn permits the contacts O to assume the normally open position. The direct current circuit to the winding of clutch 103 is thereby broken at O and the clutch disengages, precluding the removal of a second blank from the hopper in a manner hereinbefore described.

Since one side of the control circuit of CR—63 and CR—6300 passes through the normally closed contacts of CR—103 before connecting with LL1, neither of the insert feed clutch relays may operate until CR—103 is de-energized. As CR—103 is de-energized only while an envelope blank retains switch 119 in open position, it follows that inserts may be fed to the conveyor buckets only at such time as an envelope blank is in position in the distender. As a result, if the envelope blank hopper should fail to discharge a blank, the flow of inserts automatically stops.

If, when starting the machine, the conveyor belt is not in position for disposing the buckets in alignment with the insert discharge mechanisms, the belt will move until such position is reached. Contact post 137 and contact 138 of one of the buckets thereupon will contact spring contact 139 and contact 141, respectively, for closing the circuit through CR—48. The circuit will be from LL1 to CR—48, through CR—48 to contacts 139, 137, 138 and 141 of the bucket, then through conductor 401 to return lead LL2. When CR—48 is thus energized, its normally closed switch C is automatically opened, thereby breaking the circuit through the winding of clutch 48 and stopping the conveyor.

It should be observed that whenever an envelope blank is disposed between the contacts of normally closed switch 119 in the distender 32, CR—103 is de-energized; switch C of CR—103 is closed, thereby permitting the flow current from LL1, through said switch C, through relays of CR—63 and CR—6300, through normally closed contacts 79 and 7900 of the insert feed units, then to return lead LL2. As the current passes through CR—63 and CR—6300, the normally open switches O thereof are automatically closed for completing the 115 volt direct current circuit through each of the clutches 63 and 6300. As clutches 63 and 6300 are energized, the mechanisms for removing inserts from the hoppers are actuated, and inserts are disposed between normally closed contacts 79 and 7900 which immediately breaks the circuit to each of the clutch relays of 63 and 6300. This prevents removal of more inserts from the hoppers. In the event that an insert fails to reach either contact 79 or contact 7900, the kick roll magnets 87 cannot operate to discharge inserts into the buckets. The reason for this is that the normally closed contacts C of CR—63 and CR—6300 are connected in series with the kick roll magnets, which magnets cannot be energized unless switches C are both closed, or, in other words, unless CR—63 and CR—6300 are de-energized.

When inserts are positioned between the contacts of switches 79 and 7900, the circuit of the kick roll magnets 87 is closed, whereupon the inserts are ejected into buckets 27 in a manner previously described. At the same time, magnet 142, being in the circuit also, is energized for moving the contacts 139 from engagement with bucket contact 137, whereupon CR—48 is de-energized and switch C thereof returns to normally closed position for completing the circuit to clutch 48. As clutch 48 engages, the conveyor belt is moved, lowering the buckets carrying the inserts.

Each time that the inserts leave the insert feed units, contacts 79 and 7900 return to normally closed position for energizing CR—63 and CR—6300 whereupon clutches 63 and 6300 operate the mechanisms for removing inserts from their respective hoppers. At the same time, magnet 142 is de-energized and permits the movement of contacts 139 to normal position. As the various operations thus far described are repeated, the buckets successively deposit their accumulated inserts onto conveyor whence they are carried to and deposited in the blank positioned in distender 32.

After depositing the inserts, the bucket contacts a pair of switch members 218 and 219 for closing a circuit embracing kick roll magnet 120 which actuates rolls 129 and 130 for ejecting the filled envelope blank from the distender. Switch 119 thereupon returns to closed position for completing the circuit through CR—103, which in turn actuates the envelope feed unit for placing another envelope in receiving position.

As the filled envelope leaves the distender, it breaks the electrical connections at 152 and 153 whereupon magnet 155 is de-energized and the top flap gluer is actuated in a manner previously described. As the envelope blank continues to move through the various conveyor rolls, the flap is turned and pressed.

The filled envelope then passes between normally closed contacts 174 on advancer rolls 173, thereby breaking the circuit of magnet 175 and permitting spring 190 to move lift roll 176 to the inoperative or open position (Fig. 14). After the envelope has left rolls 173, contact is again made at 174 and magnet 175, becoming energized, serves to move the lift roll to the operative position shown in Fig. 14. The filled envelope is lifted and advanced to a position between contact plate 178 and the discs or roller contacts 195 and 196. The circuit of magnet 201 is thereby broken and the side flap gluers are actuated in a manner previously described. After sealing or pressing of the side flaps by the sealer roller 212, the filled and sealed envelope is discharged from the machine.

It is to be understood that various changes and modifications may be made in the structural details of the device of this invention, without departing from the spirit and scope of the invention as set forth in the appended claims. For instance, the gluing devices may be replaced by moistening means adapted to moisten glue applied to the flaps previous to the insertion of the blanks into the hopper. In instances where it is desired to glue only one side flap of an envelope, a tucker may be provided to replace one of the side flap gluers. It is to be understood also that any suitable type of electrically controlled clutch may be employed in lieu of that indicated in the drawings and description.

What is claimed is:

1. In a device of the class described the combination of a conveyor comprising receptacles, a hopper adapted to receive a supply of inserts, controllable means for removing a single insert from the hopper and advancing same, a normally inoperative ejector means for receiving said single insert and for ejecting it into one of the receptacles, electrical means conditioned by contact with said single insert for simultaneously actuating the ejector means and rendering the controllable means inoperative, an envelope blank feeding mechanism for disposing a blank in a position to receive the contents of a receptacle, means for moving the filled envelope blank from said receiving position, and means operable upon the filled blank for shaping and closing the blank in envelope form about the contents thereof.

2. In a device of the class described, the combination of a conveyor comprising spaced receptacles, a hopper adapted to receive a supply of inserts, controllable means for removing a single insert from the hopper and advancing same, a normally inoperative ejector means for receiving said single insert and for ejecting it into one of the receptacles, electrical means conditioned by contact with said single insert for simultaneously actuating the ejector means and rendering the controllable means inoperative, an envelope blank feeding mechanism for disposing a blank in a position to receive the contents of a receptacle, and means for moving the filled envelope blank from said receiving position.

3. In a device of the class described, the combination of a conveyor comprising spaced receptacles, a hopper for receiving a supply of inserts, controllable means for removing a single insert from the hopper and advancing same, a normally inoperative ejector means for receiving said single insert and for ejecting it into one of the receptacles, electrical means conditioned by contact with said single insert for simultaneously actuating the ejector means and rendering the controllable means inoperative, an envelope blank feeding mechanism for disposing a blank in a position to receive the contents of a receptacle, and means set in motion by one of the receptacles for moving the filled envelope blank from said receiving position.

4. In a device of the class described, the combination of a conveyor comprising receptacles, a hopper for receiving a supply of articles, controllable means for removing a single article from the hopper and advancing same, a normally inoperative ejector means for receiving said single article and for ejecting it into one of the receptacles, and means, conditioned by contact with said single articles, for simultaneously actuating the ejector means and rendering the controllable means inoperative whereby to replace with a second article, the article ejected.

5. In a device of the class described the combination of envelope closing means, intermittently operated means for collecting assortments of inserts, means for introducing an assortment of inserts in each envelope prior to the closing thereof, and means actuated by the filled envelope for controlling the operation of the intermittently operated collecting means.

6. In a device of the class described the combination of a plurality of hopper means, one of which is adapted to receive pieces comprising partly folded envelopes, the other receiving pieces of mail matter for insertion in the envelopes, means associated with said hoppers for extracting single pieces therefrom, retaining means adapted to hold such extracted pieces and comprising normally closed electrical contacts between which the pieces are received for breaking the electrical circuit, conveyor means comprising receptacles adapted to receive the pieces of mail matter and to direct them to the envelope blanks, continuously operated power means for said extractor means, retaining means and conveyor, electrical clutches for each of said parts and a normally closed electrical circuit means having the contacts in series therein and precluding operation of the clutches when any of said contacts, comprising the retaining means, are in abutment with one another.

7. In a machine of the class described, a magazine for holding a pack of envelopes, each envelope normally constituting a sheet folded upon itself to provide an open V pocket for the reception of mailable matter, conveyor means for consecutively conveying the envelopes from the magazine with the traverse of each envelope interrupted at a loading station, a stationary chute intersecting the path of envelope travel to open and engage into the envelope pocket, a conveyor for conveying mailable matter in a direction transverse to the travel of the envelope and depositing the same into the envelope through the stationary chute, and folder devices for folding closure flaps to seal the envelope as the envelope with its contents is being conveyed.

8. In a machine of the class described for inserting mailable matter in envelopes, each envelope normally constituting a sheet folded upon itself to provide an open V pocket for the reception of mailable matter, a conveyor means for consecutively conveying the envelopes and interrupted at a loading station, a stationary chute intersecting the path of envelope travel to open and engage into the envelope pocket, a conveyor for conveying collated mailable matter in a direction transverse to the travel of the envelope for depositing the mailable matter into the envelope through the stationary chute, and folder devices for folding closure flaps to seal the envelope as the envelope with its contents is being conveyed.

In testimony whereof, we have hereunto subscribed our names this 6th day of October, 1928.

JACOB B. FRECH.
ELMER J. FRECH.
WESLEY S. COX.